Patented Oct. 2, 1951

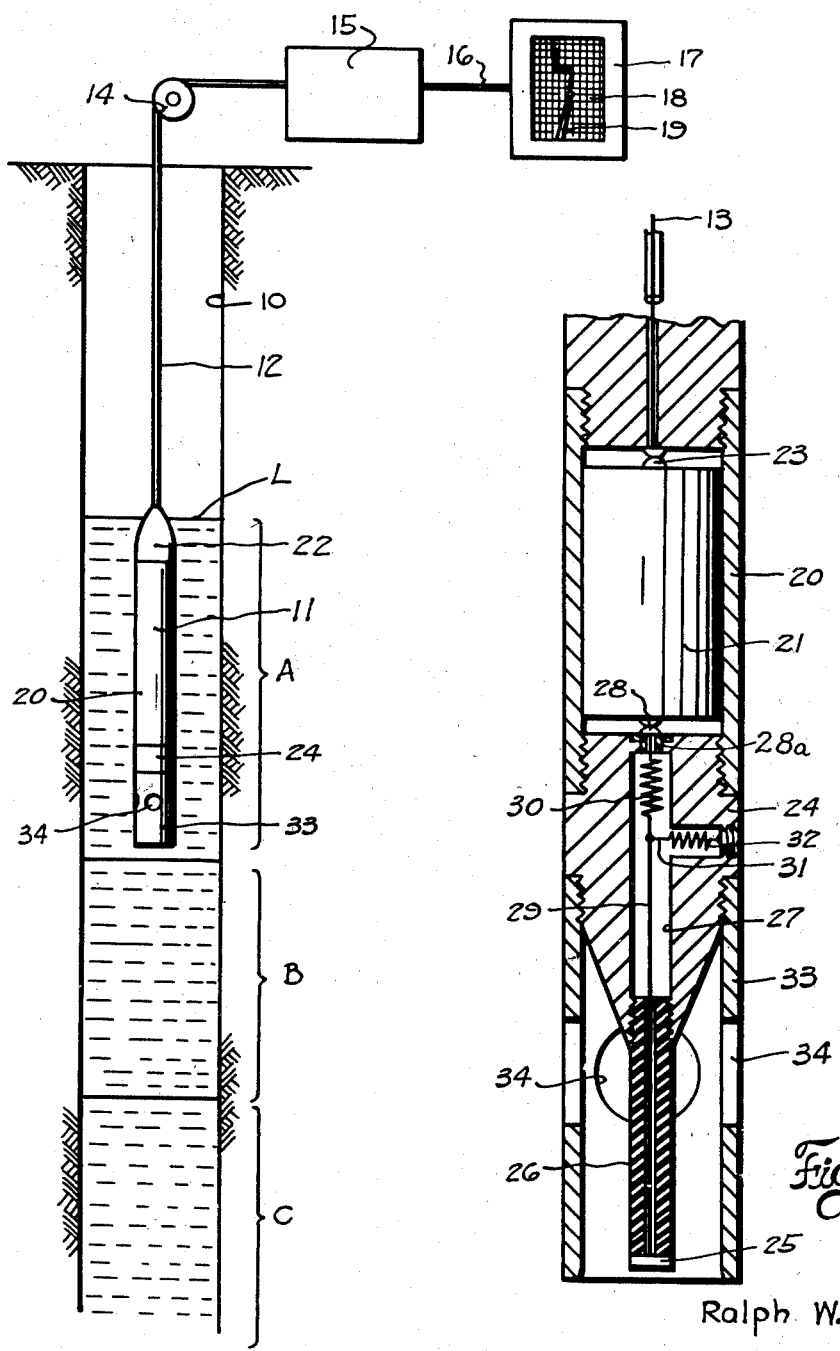

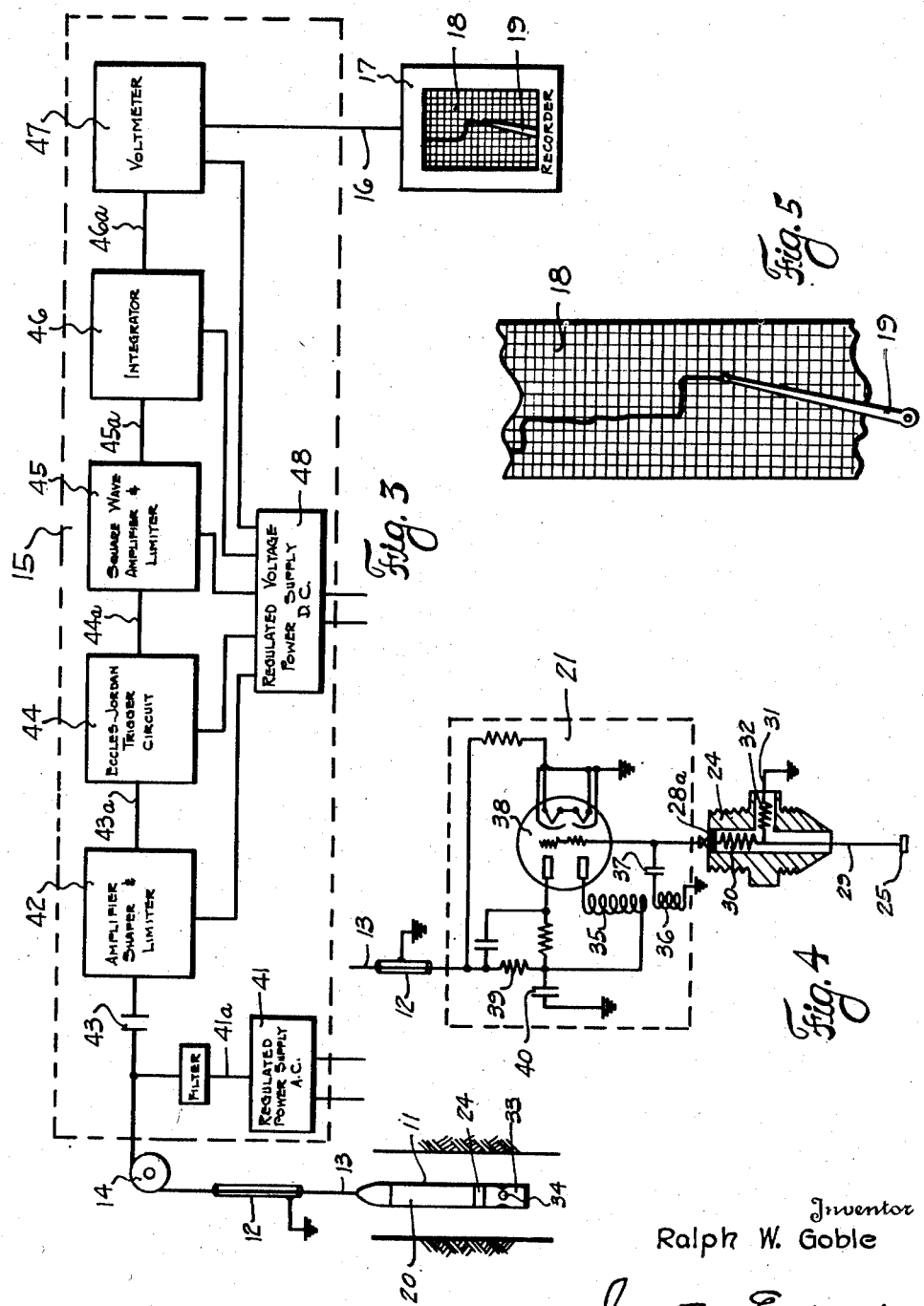

2,570,111

UNITED STATES PATENT OFFICE 2,570,111

APPARATUS FOR DETERMINING THE CHARACTER OF FLUIDS WHICH ARE PRESENT IN WELL BORES

Ralph W. Goble, Long Beach, Calif., assignor to Eastman Oil Well Survey Company, Denver, Colo., a corporation of Delaware Application November 21, 1947, Serial No. 787,390

7 Claims. (Cl. 175—182)

1

This invention relates to new and useful improvements in apparatus for determining the character of fluids which are present in well bores.

It is well known that saline or salt water and gas, as well as hydrocarbon or other fluid, are present in various subterranean strata which are traversed by a well bore and this water and gas enters the bore to admix with the oil and other well fluids which flow into the bore from the producing formation. Obviously because the water, gaseous fluid and oil are thoroughly admixed with each other when brought to the surface, it is impossible to determine the particular elevation at which the various fluids have entered the fluid column.

Various methods of locating the point of ingress of water and of determining the particular character of fluid present in the bore have been devised and probably the most popular has included the measurement of one or more electrical properties of the fluid column in the well bore. Specifically, methods are now in general use which employ spaced electrodes which are connected with a conductor cable, said electrodes being lowered downwardly through the well fluids. The particular fluid which is encountered and which is disposed between the spaced electrodes has a certain particular resistance value and by measuring this resistivity, information as to the particular fluid between the electrodes at any given time is obtained. Because the electrodes are usually connected through a conductor cable with the surface indicating equipment, the cable forms a part of the electrical circuit and the change in the resistance and capacitance of the cable, as it is affected by temperatures and other conditions in the well bore, results in erroneous measurements. To counteract the affect of change in the electrical properties of the cable it has become the practice to employ contacts of relatively large area and to locate them relatively close to each other. The use of the larger area contacts located close to each other minimizes the affect of the cable loss variation but because the contacts of larger area reduce the resistances, a high amperage or current is required in order to obtain desirable indications. Probably the major disadvantage of the larger area electrodes or contacts which are spaced relatively close to each other is the fact that the resistance which is created by the fluid between such contacts is very low and because of this low resistance, sensitive readings cannot be obtained. It is well known that water may have more or less salt content and with the normal apparatus now in general use, it is substantially impossible to distinguish between water having a higher or lower salinity since as explained, the apparatus is not sufficiently sensitive to distinguish minor differences in the fluid.

It is one object of the present invention to provide an improved apparatus for determining the character of fluids present in a well bore which employs spaced electrodes for measuring the resistivity of fluid between said electrodes and which is so constructed that extremely sensitive measurements of minor changes in the well fluid characteristics may be made.

An important object of the invention is to provide an improved measuring apparatus, of the character described, wherein the electrodes or contacts are of relatively small area and are spaced a greater distance apart, whereby the resistivity changes in the fluid between the electrodes is relatively high which makes possible the accurate determination and indication of minor differences in the characteristics of the different well fluids.

A further object of the invention is to provide an improved measuring apparatus of the spaced electrode type wherein the resistance set up by the fluid between the electrodes is employed to control a transmitter in such manner that any variations which may be caused by the effect of well conditions on the transmitting cable have no effect on the measurements being made.

Still another object of the invention is to provide an improved apparatus, of the character described, which may be combined with an improved transmiting and indicating apparatus and wherein the changes in resistivity of the fluid between the electrodes is utilized to control the frequency of transmitted electrical pulses, whereby this frequency is representative of the particular fluid which is encountered by the electrodes; the variations in frequency being utilized to operate a surface recorder which will visibly record said variations to provide information regarding the fluid being encountered by the measuring apparatus.

The construction designed to carry out the invention will be hereinafter described together with other features of the invention.

The invention will be more readily understood from a reading of the following specification and by reference to the accompanying drawing, wherein an example of the invention is shown, and wherein:

Figure 1 is a vertical, sectional view of a well bore showing the improved apparatus constructed in accordance with the invention, with the measuring unit being lowered within said bore, Figure 2 is an enlarged, transverse, sectional view of the measuring unit which is arranged to be lowered through the well bore, Figure 3 is a block diagram of the surface recording apparatus, Figure 4 is a wiring diagram of the transmitter and electrode circuit, and Figure 5 is a partial view of the chart illustrating the recording which is obtained.

In the drawings, the numeral 10 designates a well bore which traverses the various subterranean strata in the usual manner. The various strata which are encountered are, of course, dependent upon the particular area in which the well bore is located and ordinarily water, gas and oil flow into the well bore. Merely for the purpose of illustration the well bore has been shown as having an oil stratum A, a fresh water stratum B and a salt water stratum C therein, these fluids having entered the bore from the different subterranean formations.

The well fluids will gradually diffuse and admix with each other and will rise to a normal standing level L within the bore and the longer said fluids are permitted to stand in said bore undisturbed, the more difficult it becomes to determine the point of entry of the various constituents because manifestly the water will tend to settle while the gas and oil will tend to rise. In making measurements to determine this entry, it has become usual practice to carry out bailing operations which remove a portion of the well fluids from the upper end of the column. This removal of a portion of the fluid column results in an unbalancing of the static condition and permits additional fluids to enter the bore. By taking measurements immediately following the bailing operation and while the natural fluids are again entering the bore, it is possible to determine the point of entry of the various fluids. As has been stated, the general method now in use employs spaced electrodes which are lowered on a conductor cable and which are utilized to measure the resistivity of the fluids encountered by the electrodes.

The present invention relates primarily to the apparatus, rather than to the method and as shown in Figure 1 includes a measuring unit assembly 11 which is arranged to be lowered within the well bore on a conductor cable 12. The cable is preferably of the single conductor type having an electrical conductor 13 extending upwardly through an outer grounded sheath, said sheath forming the ground side of the circuit. The conductor cable passes over a suitable sheave or pulley 14 in the derrick (not shown) and is electrically connected to a receiving unit 15 at the surface. The receiving unit has electrical connection through a wire 16 with a suitable recorder 17. The recorder includes a movable tape or chart 18, the movement of which is synchronized with the lowering of the unit 11 and a movable stylus 19 is adapted to mark said chart. As will be explained, the stylus 19 is controlled in its operation by the receiver unit 15 and provides a visible record of the resistivity measurement which is being made by the unit 11. It is noted that any suitable electrically operated recorder may be employed.

The measuring unit 11 is clearly shown in Figure 2 and includes an outer conductive casing 20 which has an electrical oscillator or transmitter 21 housed therein. The upper end of the casing 20 has connection with a cable socket 22 to which the cable 12 is secured. An electrical connection between the conductor 13 within the cable 12 and the oscillator 21 is made through suitable contacts 23.

Threaded into the lower end of the casing 20 is a plug member 24 which is constructed of a suitable electrical conducting material and which forms an upper electrode. A lower electrode 25 is suitably mounted in the lower end of an insulating sleeve 26 of Bakelite or other suitable insulating material, which sleeve has its upper end threaded into the axial bore 27 of the plug or upper electrode 24. Contacts 28 which are suitably insulated at 28a from the upper electrode 24 connect a lead wire 29 with the oscillator 21 and said lead wire extends downwardly through the bore 27 of the upper electrode and then through the insulating sleeve 26 to the lower electrode. An electrical resistance 30 is connected in the wire 29. The wire 29 is also electrically connected through a conductor 31 with the upper electrode 24 and a resistance 32 is mounted in this connecting wire. A protective housing 33 which has its lower end open is threaded onto the plug 24 and encloses the insulating sleeve 26 and lower contact or electrode 25. The protective housing is provided with openings 34 in its side walls to permit a free circulation of fluid around the upper and lower electrodes 24 and 25, and may be constructed of a suitable electrical insulating material; however, if constructed of an electrical conducting material, such as metal, the protective sleeve 33 will, in effect, become a part of the upper electrode.

The oscillator 21, as will be explained, is arranged to generate and transmit electrical pulses of a predetermined frequency, which pulses are conducted to the surface equipment through the conductor 13, the other or ground side of the oscillator circuit being formed by the outer grounded sheath 12. The electrodes 24 and 25 are connected through the wire 29 with the transmitter circuit and as the unit 11 is lowered into the well, the electrodes 24 and 25 are contacted by the well fluids. Each fluid or liquid within the well bore has a different electrical resistance in accordance with its characteristics and, therefore, as the electrodes are moved into contact with a particular fluid, an electrical resistance, in accordance with the particular fluid being encountered, is in effect connected between the electrodes 24 and 25. This resistance, which is dependent upon the particular fluid being encountered is utilized to control the frequency of the electrical pulses which are generated by the oscillator 21 and thus, the frequency of the pulses is a measure of the particular fluid being encountered by the electrodes. Thus, when the electrodes encounter water having a certain salinity, the frequency of the transmitted pulses will be at a predetermined rate. Upon the electrodes being moved downwardly into water having a higher salt content, the resistance between the electrodes is decreased with a resultant change in the frequency of the transmitted pulses. Thus, it might be said that the frequency of the transmitted pulses is indicative of the particular fluid or liquid being encountered by the electrodes and by utilizing this frequency to actuate a recorder, a visible indication of the character of the fluid within the well bore may be obtained.

A wiring diagram of the oscillator 21 is illustrated in Figure 4 and as illustrated comprises a pulse oscillator which is preferably constructed to generate and transmit negative electrical pulses. The transmitter includes a blocking oscillator circuit which comprises coils 35 and 36, condenser 37 and the electrodes 24 and 25. The electrical resistance which is formed by the fluid between the electrodes 24 and 25 is also a part of the blocking oscillator circuit. An amplifier tube 38 is coupled in the circuit and is arranged to amplify only the negative side of the oscillator cycle, whereby only negative pulses are generated and transmitted. The frequency of the oscillator is controlled by the RC circuit which comprises the condenser 37 and the resistance formed by the fluid between the electrodes so that actually the resistivity of the fluid controls the time required to discharge the condenser 37. If the resistance formed by the fluid engaging the electrodes 24 and 25 is varied in value due to the changing fluids encountered, the discharge time of the condenser 37 is varied accordingly and thus the frequency of the transmitted negative pulses is controlled by this RC circuit and is varied in direct ratio to the variation in the fluids encountered. A filter resistor 39 is connected in the conductor 13 which extends to the surface and a filter condenser 40 is associated therewith, these parts functioning to prevent feeding back of the transmitted pulses into the blocking oscillator circuit.

It will be obvious that this arrangement of the transmitter results in the generation and transmission of the electrical pulses which are conducted upwardly to the surface through the conductor 13. The frequency of these pulses is controlled and varied in direct proportion to the variation in the resistance formed by the fluids engaging the electrodes 24 and 25 and thus the frequency of the transmitted electrical negative pulses is representative of the fluids encountered by the electrodes.

The receiving unit 15 and the recorder 17 is illustrated in block diagram in Figure 3 and as shown therein the conductor 13 extends upwardly from the transmitter 21 to the surface. The required power for operating the transmitter may be supplied by a regulated power supply 41 at the surface which has connection through a conductor 41a with the conductor 13, whereby said conductor functions to carry the current required to operate the transmitter and is also the carrier for the transmitted negative pulses which are representative of the fluids encountered in the well bore by the electrodes 24 and 25. The outer sheath of the cable 12 is, of course, the ground side of the circuit as is usual practice.

The receiving unit 15 includes an amplifier, shaper and limiter 42 to which the upper end of the conductor 13 is connected. The unit 42 is a standard device well known in the art and functions to shape the received pulses and to limit the same to a desired value, as well as to amplify said pulses prior to their passage to the subsequent circuits of the receiver. A suitable blocking condenser 43 is connected in the conductor 13 beyond the point at which the power supply line 41a has connection therewith and this condenser functions to prevent the current supplied by the power supply unit 41 from flowing into the unit 42. The receiving unit 15 also includes an Eccles-Jordan trigger circuit 44 which has connection with the amplifier, shaper and limiter through a wire 43a. The trigger circuit 44 is connected through a wire 44a with a square wave amplifier and limiter 45 and the latter has connection through a conductor 45a with an integrator 46. The integrator is in turn connected through a wire 46a with a vacuum tube voltmeter 47 and the latter unit has connection through the wire 16 with the recorder 17. The various units 42 to 47 of the receiving apparatus 15 are supplied with necessary power through a suitable regulated power supply 48. The circuits which are included in the units 42 to 47 function to receive the transmitted negative pulses and to convert them into amplitude whereby said pulses may be utilized to actuate the stylus 19 of the recorder 17. Actually the receiver 15 comprises a counter circuit or frequency meter and the particular details of its electrical circuits are subject to some variation.

In the operation of the apparatus, the measuring unit 11 is lowered downwardly into the well bore and this is ordinarily done immediately following a bailing operation. The transmitter 21 is operated continuously so that with the electrodes 24 and 25 not in contact with any well fluids, negative electrical pulses of a predetermined frequency are generated. These pulses being conducted upwardly to the receiving unit 15 are converted into amplitude and this amplitude functions to control the position of the stylus 19 of the recorder. At this time the calibration is such that the stylus is in zero position.

As the unit 11 is lowered within the well bore and the electrodes 24 and 25 contact a fluid therein, a particular resistance, which is in accordance with the particular characteristics of the fluid, will be set up by this fluid between the electrodes so that this resistance affects the discharge time of the condenser 37 in the transmitter circuit. This results in a change in the frequency of the transmitted pulses, which change is proportional or in direct ratio to the particular fluid encountered. The electrical pulses having a freqency representative of the character of the fluid being encountered are conducted upwardly to the surface through the cable 13 and flow into the amplifier, shaper and limiter 42. This unit is provided for the purpose of returning the negative pulses to their original pattern or wave form, that is, to the same form which they had as they left the transmitter and prior to the time that they were affected by the conductor 13. In addition, the unit 42 limits the pattern or shape of the pulses to provide uniformity of pattern and at the same time amplifies said pulses.

From this point the negative pulses travel through the Eccles-Jordan trigger circuit 44 which functions to convert the wave form into a square wave. After conversion into a square wave pattern the pulses flow through the square wave amplifier and limiter 45 which functions to amplify and limit the square waves. From this unit the square waves are directed into the integrator 44 which, as is well known, rectifies the same and transposes said waves into amplitude which is directly proportional to the frequency of the pulses and this amplitude is utilized to actuate the vacuum tube voltmeter 47. The vacuum tube voltmeter, being coupled through the wire 16 to the recorder 17, functions to control the movement of the stylus 19 of said recorder.

Since the amplitude which operates the voltmeter is directly proportional to the frequency of the negative pulses and also since said frequency is controlled in accordance with the character of the fluid which is encountered by the electrodes 24 and 25, it will be evident that the amplitude will vary in direct ratio to any variation or change in the fluid surrounding the electrodes. Thus, the varying amplitude is a direct measure of the varying frequency which, in turn, is representative of different types of fluid and therefore, the stylus 19 provides a visible record of the variation in fluids encountered by the electrodes.

The chart 18 of the recorder is synchronized in its longitudinal movement with the lowering of the measuring unit 11 so that the recording by the stylus longitudinally of the chart is representative of depth. Any movement of the stylus transversely of the chart, as controlled by the changing frequency of the transmitted pulses is a measurement of the resistivity of the fluid between the electrodes 24 and 25 and is therefore an indication of the particular fluid being encountered. The record obtained on the chart is illustrated in Figure 5 and it will be apparent that so long as the electrodes are moving through one particular strata, the stylus will indicate substantially the same resistivity throughout this strata; as the electrodes move from one liquid or fluid into another having a different resistivity, a movement will be imparted to the stylus transversely of the chart to record this change. By known methods of correlation, it will be evident that the chart so produced actually provides a visual record of the fluids or of the character of the fluids through which the electrodes 24 and 25 are moved.

It is pointed out that with the present apparatus, the conductor 13 which connects the measuring unit 11 with the surface equipment is not actually a part of the electrical circuit of the transmitter in which the electrodes 24 and 25 are connected but is merely a carrier for the generated pulses. In other words, the conductor is provided for the purpose of conducting the transmitted electrical pulses to the surface while the electrodes 24 and 25 function to change the frequency of said pulses in accordance with the particular fluid which is encountered. With this arrangement, the variations which might occur in the cable due to temperature or other conditions do not affect the measurement being made, as is the case in the usual electrode type of measuring apparatus. The resistance set up by the fluid between the electrodes varies with the character of the fluid encountered and it is this change in resistance which controls the frequency of the transmitted pulses. The conductor 13 is merely a carrier for the pulses and has no affect on the frequency thereof so that accurate measurements are assured.

Since the conductor 13 is completely foreign to the electrical circuit in which the electrodes are connected, it is possible to make the electrodes of a relatively small area and also it is possible to space the same a considerable distance apart. This is true because the closer spacing and larger area which is necessary to overcome the normal cable loss variations in the usual apparatus is not required. By being able to locate the electrodes a further distance apart, the resistance caused by the fluid between said electrodes is greater and minor variations in such resistance are more readily measurable. This makes the apparatus much more sensitive in operation since relatively minute differences in fluid will result in frequency changes in the transmitted pulses, whereby the relatively minor differences are accurately recorded.

The fixed resistances 30 and 32 which are connected in the wires 29 and 31 leading to the electrodes are provided in order to limit the frequency operation of the oscillator at the upper and lower limits of said oscillator. In the event that salt water or other liquid which might substantially short out the circuit should be encountered, the apparatus might be rendered inoperative unless the resistance 30 were included. Under such a condition, the resistance 30 would maintain sufficient resistance between the electrodes to prevent complete shorting out of the circuit. Similarly, if a fluid of low electrical conductivity, such as oil, is encountered under certain conditions, the resistance caused by such fluid would be excessive to the point of forming an open circuit and thereby rendering the oscillator inoperative; in such case, the resistance 32 being connected in the circuit would function to maintain at least some resistance in the circuit and would sustain operation of the oscillator at its lower limit. The use of the resistances 30 and 32 is important because they assure that the transmitter will remain operative irrespective of the character of the fluid which may be encountered by the electrodes. Typical values for the resistors 30 and 32 which have been found satisfactory are 100 ohms and 200,000 ohms, respectively. With such values, the upper oscillating frequency would be limited to approximately 7,000 or 8,000 cycles per second or pulses per second when the electrodes 20 and 25 are within salt water and the circuit is substantially shorted. When in open air, with high resistance between the electrodes 20 and 25, the oscillating frequency will be approximately 100 cycles per second or 100 pulses per second. These examples as to the frequency of the oscillator are on the assumption that the condenser 37 in the oscillating circuit is .01 micro-farad.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An apparatus for determining the character of fluids within a well bore which includes, a measuring instrument having spaced electrodes thereon adapted to be lowered within the well bore, whereby the fluid therein is encountered by said electrodes and creates an electrical resistance therebetween, an electrical transmitter mounted in the measuring instrument and having means for generating and transmitting electrical pulses, said electrodes being electrically connected in the transmitter circuit, means for utilizing the resistance formed by the fluid encountered by the electrodes for varying the electrical characteristics of the transmitted pulses, whereby the variations in said pulses as produced by different fluids, are representative of the variations in the character of said fluid, and electrical resistance means connected in the electrical connection between the electrodes and the transmitter circuit for regulating the upper and lower limits of resistance across the transmitter circuit whereby operation of the transmitter is assured in the event that the resistance value of the fluid encountered by the electrodes falls below or exceeds a predetermined value.

2. An apparatus for determining the character of fluids within a well bore which includes, a measuring instrument having spaced electrodes thereon adapted to be lowered within the well bore, whereby the fluid therein is encountered by said electrodes and creates an electrical resistance therebetween, an electrical transmitter mounted in the measuring instrument and having means for generating and transmitting electrical pulses, said electrodes being electrically connected in the transmitter circuit, means for utilizing the resistance formed by the fluid encountered by the electrodes for varying the electrical characteristics of the transmitted pulses, whereby the variations in said pulses as produced by different fluids, are representative of the variations in the character of said fluid, electrical resistance means connected in the electrical connection between the electrodes and the transmitter circuit for regulating the upper and lower limits of resistance across the transmitter circuit whereby operation of the transmitter is assured in the event that the resistance value of the fluid encountered by the electrodes falls below or exceeds a predetermined value, means for conducting the electrical pulses to the surface, and means at the surface for transposing the variations in the electrical pulses into visible indications which are representative of the character of the various fluids encountered by the electrodes of the measuring instrument.

3. An apparatus for determining the character of fluids within a well bore which includes, a measuring instrument adapted to be lowered within the well bore and having means for generating electrical pulses, a pair of spaced electrodes on said instrument exposed to the well fluids in said bore as the instrument is lowered therein, whereby the fluid contacting said electrodes forms an electrical resistance therebetween with the value of said resistance being in accordance with the character of said fluid, means for electrically connecting the electrodes to the pulse-generating means whereby the resistance between the electrodes as controlled by the fluid encountered controls the frequency of the electrical pulses, electrical resistance means connected in the electrical connection between the electrodes and the transmitter circuit for regulating the upper and lower limits of resistance across the transmitter circuit whereby operation of the transmitter is assured in the event that the resistance value of the fluid encountered by the electrodes falls below or exceeds a predetermined value, means for conducting the electrical pulses to the well surface, and means at the surface for transposing the frequency of said pulses into visible indications which are representative of the character of the fluid encountered by the electrodes.

4. The combination with an electrical oscillator having means for transmitting electrical pulses and operable over a predetermined frequency range, of a measuring apparatus including, a pair of spaced electrodes, means for connecting one of said electrodes to ground, a conductor for electrically connecting both electrodes in the oscillator circuit, whereby variations in the electrical properties of the fluid between the electrodes will result in variations in frequency in the output of the oscillator, and electrical resistance means connected in the conductor between the oscillator and the electrodes and functioning to establish the upper and lower limits of resistance across the oscillator circuit whereby operation of the oscillator is assured regardless of either excessive or inadequate electrical resistance between the electrodes.

5. The combination with an electrical oscillator having means for transmitting electrical pulses and operable over a predetermined frequency range, of a measuring apparatus including, a pair of spaced electrodes, means for connecting one of said electrodes to ground, a conductor for electrically connecting both electrodes in the oscillator circuit, whereby variations in the electrical properties of the fluid between the electrodes will result in variations in frequency in the output of the oscillator, an electrical resistance connected in the conductor between the oscillator and the ungrounded electrode and having a value which will assure continued operation of the oscillator in the event that the electrical resistance value of the fluid between the electrodes is excessively low, and a second electrical resistance connected in the conductor between the oscillator and the grounded electrode and having a value which will assure continued operation of the oscillator in the event that the electrical resistance value of the fluid between the electrodes is excessively high.

6. An apparatus for determining the character of fluids within a well bore including, an electrical oscillator having a variable frequency output, a pair of spaced electrodes, means for grounding one of said electrodes, means for connecting both of said electrodes in the oscillator circuit, whereby variations in the electrical resistance value of fluid between the electrodes causes variations in the frequency of the output of the oscillator, and a pair of electrical resistance means in the connection between the oscillator and the electrodes, each resistance means being associated with one of the electrodes, the resistance means between the grounded electrode and the oscillator being of a higher value than the electrical resistance between the oscillator and the other electrode, whereby said resistance means establish the upper and lower limits of resistance across the oscillator circuit to assure operation of the oscillator in the event the resistance value of the fluid between the electrodes falls below or exceeds a predetermined point as controlled by the values of said resistance means.

7. An apparatus as set forth in claim 6, wherein the electrical connection between the oscillator and the ungrounded electrode is a conductor and also wherein the electrical resistance means associated with said ungrounded electrode is connected in said conductor, a second conductor between the first conductor and the grounded electrode, said second conductor being connected to the first conductor beyond the resistance means associated with the ungrounded electrode and having the second resistance means which is associated with the grounded electrode connected therein.

RALPH W. GOBLE.

REFERENCES CITED

The following references are of record in the file of this patent:

UNITED STATES PATENTS

| Number | Name | Date |
|---|---|---|
| 2,096,877 | Bowman-Manifold et al. | Oct. 26, 1937 |
| 2,140,004 | Falloon | Dec. 13, 1938 |
| 2,364,957 | Douglass | Dec. 12, 1944 |
| 2,370,818 | Silverman | Mar. 6, 1945 |
| 2,388,141 | Harrington | Oct. 30, 1945 |
| 2,491,486 | Ewen | Dec. 20, 1949 |

OTHER REFERENCES

"Geophysical Exploration," Heiland; pages 825–829; pub. 1940 by Prentice Hall, Inc., N. Y.